United States Patent [19]
LeMire

[11] Patent Number: 4,935,116
[45] Date of Patent: Jun. 19, 1990

[54] WATER PURIFICATION DEVICE

[75] Inventor: George J. LeMire, Plainville, Mass.

[73] Assignee: Mohawk Systems, Inc., Pawtucket, R.I.

[21] Appl. No.: 271,685

[22] Filed: Nov. 16, 1988

[51] Int. Cl.$^5$ .......................... C25B 9/00; C25B 15/08
[52] U.S. Cl. .................................... 204/237; 204/238; 204/248; 204/260; 204/271; 204/275; 204/290 R
[58] Field of Search ............... 204/248, 272, 271, 238, 204/150, 152, 290 R, 249, 237

[56] References Cited

U.S. PATENT DOCUMENTS

| | | | |
|---|---|---|---|
| 2,243,761 | 5/1941 | Matzka | 204/248 |
| 2,334,790 | 11/1943 | Roffy | 204/248 |
| 2,358,981 | 9/1944 | Lattner | 204/248 |
| 2,607,725 | 8/1952 | Butler | 204/248 |
| 2,658,033 | 11/1953 | Ferris | 204/152 |
| 2,687,996 | 8/1954 | Butler | 204/248 |
| 4,525,272 | 6/1985 | Henson | 204/272 X |

Primary Examiner—Donald R. Valentine
Attorney, Agent, or Firm—Robert J. Doherty

[57] ABSTRACT

A device for treating water within a swimming pool wherein a portion of such water is diverted to the device. The device utilizes a canister in which dissimilar metals preferably silver and copper are positioned such that the water passing between them acts as a conductor and establishes a voltaic cell whereby the metals are eroded so as to supply the water with an effective level of silver and copper ions. Such metal ions effectively act as germicides and algaecides.

14 Claims, 2 Drawing Sheets

WATER PURIFICATION DEVICE

BACKGROUND AND OBJECTS OF THE INVENTION

This invention relates to a water purification system and more particularly to a device in which silver ions are used to kill and prevent the growth of germs and bacteria in swimming pools and the like. As such, this invention relates to and is a modification and/or improvement over U.S. Pat. No. 4,504,387 issued March 12, 1985 and entitled SYSTEM AND METHOD FOR WATER PURIFICATION to George J. LeMire et al and U.S. Pat. No. 4,608,247 issued August 26, 1986 to Charles F. Heinig, Jr. and entitled COMPOSITION FOR BACTERICIDAL TREATMENT OF WATER.

The continued popularity of both public and private swimming pools and the introduction of soaking or hot tubs has increased the need for the provision of a germ-free state. Presently, it is customary to treat swimming pools with chlorine to kill the bacteria and germs present therein. There are, however, decided drawbacks to such systems some of which are discussed in the above-mentioned patents. Accordingly, it has been found desirable to eliminate chlorine disinfection systems and to utilize heavy metals and particularly heavy metals of the type commonly referred to as oligodynamic metals for the bactericidal treatment of water. A discussion of the use of such metals is also found in the above-discussed patents. The above-mentioned patent specifications are herewith specifically included in the subject specification by specific reference and incorporation thereinto.

Specifically, it would thus be desirable to provide a simple and yet effective device to provide such pool water with an effective amount of silver or other oligodynamic metal ion concentration to effectively eliminate germs and bacteria therein. These and other objects of the present invention are accomplished with a device which incorporates a voltaic cell formed by two dissimilar metals positioned within a canister such that the water to be treated passing therethrough forms a conductor and, accordingly, activates the cell such that metal ions are released into the water stream to effectively provide for the desired germicidal ion concentration in the pool, tub, etc. being treated.

Other objects, features and advantages of the invention shall become apparent as the description thereof proceeds when considered in connection with the accompanying illustrative drawings.

DESCRIPTION OF THE DRAWING

In the drawing which illustrates the best mode presently contemplated for carrying out the present invention.

DETAILED DESCRIPTION OF THE INVENTION

Figure 1:
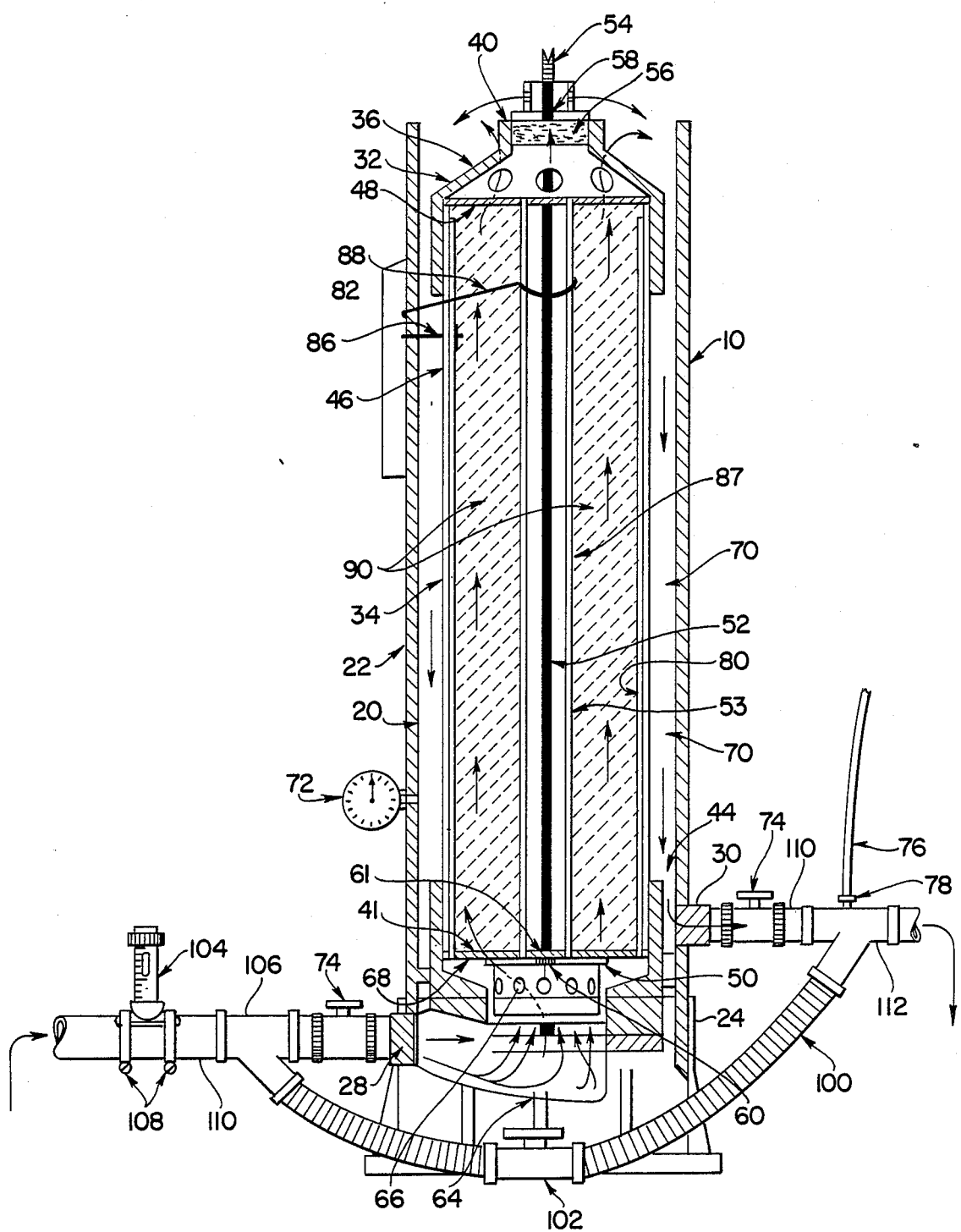
FIG. 1 is a partially sectioned view of the device of the present invention.
Figure 2:
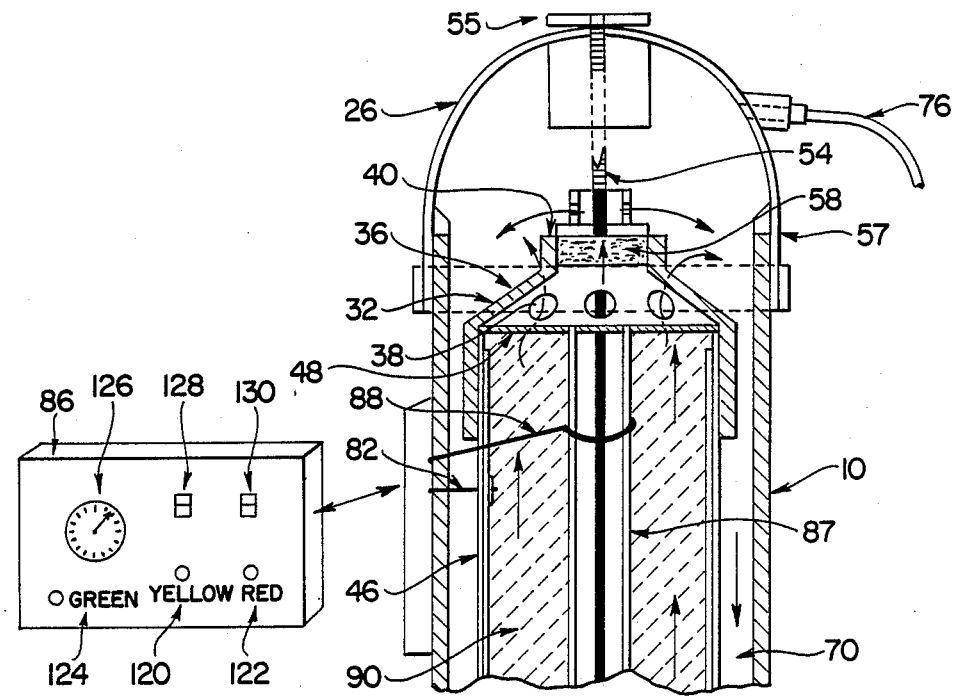
FIG. 2 is a similar view showing the upper portion of the device and in particular the placement of a warning mechanism.

Referring now to the drawing and particularly FIG. 1 thereof, the device 10 of the present invention is best shown. Such device is used in an environment which generally includes a swimming pool which may be a conventional pool either indoor, outdoor, public, or private or hot tub, soaking tub, and the like. The term swimming pool or pool as used herein thus includes the above-indicated structures. Additionally, a conventional sand filter, that is, a bed of sand through which water is withdrawn from the pool by a recycling system, may be included such that water may be purified by the device 10 prior to or after being recycled from the pool. Such recycling system generally includes a pump with suitable piping. Accordingly, a predetermined water amount is continually withdrawn from the pool at least during the operation of the pump such that the water is passed through the device 10 of the present invention after which it is returned to the pool via the recycling system above described.

The device 10 of the present invention in its preferred form includes a housing 20 including an outer casing 22 positioned on a stand 24 for upright positioning or otherwise conveniently mounted for coupling with the recycling system. The casing 22 is hollow and is provided with a closed top or dome 26 which may be preferably transparent or translucent such that the water movement through the casing 22 may be readily observed. The casing 22 is normally formed from some engineering plastic material such as reinforced fiberglass and is provided with an inlet 28 and an outlet 30.

The upper part of the casing 22 is provided with a circular flange 32 adapted to receive the upper end of a canister 34. The flange 32 includes inwardly tapered shoulders 36 in turn provided with openings 38 and an upwardly extending hollow turret portion 40. The housing 22 further includes a generally cylindrical seat or collar 44 into which the canister 34 base is received. The canister 34 is of generally open-ended, cylindrical configuration and includes an outer side wall 46, an upper end wall or radiating spider arms 48, and a similar construction in the form of an end wall or radiating spider structure and the lower end 50. Both the structures 48 and 50 if in the form of a wall include openings for the passage of water. Supported by such walls or spiders 48, 50 and running along the radial center of the canister 34 is a metal rod 52 preferably formed of copper or stainless steel. Such rod 52 is threaded at least at its top end 54 and is further positioned as above described with a plug 56 having a central hole 58 therein positioned within the turret 40. The bottom end 60 of the rod 52 may also be threaded and received into a threaded opening 61 in the housing seat structure 44 and/or in the wall or spider 50. A threaded knob 55 engages a portion of the top end 54 of rod 52 so as to enable the top end or dome 26 to be sealingly engaged to the casing 22 as through the compression of a heavy rubber ring 57 when the knob 55 is tightened.

A water diverting collar 64 is positioned in the casing 22 base and is adapted to force the water entering the inlet 28 out and through openings 66 provided in the wall thereof into an intermediate chamber 68 and then upwardly through the canister 34. The water then passes through interior portions of the canister 34 and out the openings 38 and 44 provided in the turret structure thereof and into a chamber 70 formed between the outside shell 46 of the canister 34 and the casing 22 interior. The water is then directed downwardly to the outlet 30.

A water pressure valve 72 mounted on the casing 22 may be utilized to measure the pressure within the chamber 70 such that the outlet or water flow there-from through the pipe may be regulated by the valves 74 to in turn determine the length of time the water stays within the device and more particularly within the canister 34. In order to prevent excessive air buildup in the top of the casing 26, a bleeder valve 76 is attached by means of a conventional coupling 78 to the outlet pipe 30.

The ball valves 74 thus isolate and regulate the water flow through the device. In addition, a bypass 100 connects the inlet and outlets 28 and 30 upstream and downstream respectively of the valves 74 such that water flow can be diverted from the device such that a cartridge can be changed without closing down the entire pool system. A valve 102 positioned in the bypass 100 is provided for such purpose. Also, a flowmeter 104 is positioned within suitable piping on the inlet side 28 of the device upstream of the inlet side bypass T 106. In this way the correct or desired range of flow through the unit can be regulated regardless of the equipment in the overall pool system. The bypass 100 may be formed of suitable flexible PVC material and the pipe connections 110 as well as the bypass T's 106 and 112 of rigid PVC material.

The operative aspect of the invention is provided inside the canister 34 in such a manner that a voltaic cell is established between two dissimilar metals both in contact with the water passing through the canister interior. Such operates on the principle that all water, that is, water containing some impurities, is conductive and sets up an electric cell between two dissimilar metals in contact therewith. In that regard, the inside surface of the canister's outer side wall 46 is provided with a copper shell or sleeve 80. In this regard, a copper wire 82 is soldered or otherwise both mechanically and electrically attached to the sleeve 80 and passes through the side wall 46 by means of a waterproof grommet of suitable design (not shown) and thence to a meter or instrument housing 86 attached on the casing 22 exterior and thence to a voltmeter 126 housed therein. The other dissimilar metal is provided in the form of a pure silver layer surrounding a copper tube 53 either in the form of a deposition of a pure silver layer thereon or in the form of a shell or sleeve 87 provided thereover. Similar to the connector wire 82, a silver connector wire 88 is electrically fastened to the layer or shell 87 and passes through the wall 46 and to the voltmeter 126.

Accordingly, an electrical current is developed between the dissimilar metals, namely, the copper and silver sleeves 80 and 87 respectively. A theoretical voltage generated between such metals is 0.538 volts assuming the conductive medium therebetween is ideal, however, pool water is generally of low ionic strength and, accordingly, test results with this system have shown a voltage generated on the order of 0.10 volts. As water passes through the canister as the device 10 operates, silver and copper ions are liberated to provide a residual germicide action. The average silver concentration has been found in the order of thirty parts per billion in the pool of water. Such concentration is particularly effective to prevent algae in the pool as well as an effective germicide. The fact that this device does not use an external voltage supply is both a safety factor and substantially decreases the likelihood of the device failing due to an electrical malfunction.

An example of the dimensional aspects of the silver and copper sleeves is as follows: The silver sleeve 87 was of pure silver, had a length of 28 inches, an outside diameter of 0.3 inches, and a wall thickness of 0.02 inches. The pure copper sleeve 80 had an outside diameter of 4 inches to fit snugly against the inside of the canister 34 and was also of a 28 inch length. The copper sleeve thickness was 0.018 inches.

The canister 34 may also internally contain activated charcoal granules, a ziolite or silica gel filter media which may or may not be impregnated with a material including a biologically active silver ion. Such materials 90 may include those indicated in the previously incorporated by reference patents, namely, U.S. Pat. Ser. Nos. 4,504,387 and 4,608,247.

The device 10 of the present invention may be operated in such a manner that voltage readings are taken from the voltmeter 86 over a time period such that voltage reduction from that established by normal running would indicate the erosion or near erosion of one of the dissimilar metal sleeves. Such would serve to warm the operator of the device that silver ions are no longer being transmitted to the pool and to a lesser extent, at least from the effectiveness standpoint, copper ions as well. In that regard, it should be brought out that silver ions are predominately responsible for the germicidal and algaecidal effectiveness desired but that copper ions are also an effective algaecide at low concentrations. Of course, it is not practical to chart and monitor such voltage readings and, accordingly, the voltmeter preferably includes a voltage monitor displaying warning lights to indicate near exhaustion of either one of the metal sleeves 80 or 87. Such a voltage comparative device as well as other equipment that will monitor the electrolysis process is housed within the casing of the voltmeter 86 and hereinafter is jointly referred to as the voltmeter for convenience. The voltmeter 86 is attached to the outside of casing 22 as previously indicated but may be mounted or housed where practical. An appropriate monitor that may be utilized is that manufactured by K-TRONICS under designation CPM-100. Such monitor operates by detecting the energy flow between the two dissimilar metals within the canister 34. When one of the metal sleeves is consumed to a specific level, the monitor will indicate the situation, for instance, a yellow warning light 120 located on the outside of the unit. This serves as a warning to the user to change the canister. If a change is not made and the erosion continues, the monitor may flash a red light 122 to indicate one of the shells is almost or completely exhausted and that the device 10 has thus ceased to purify the water. The monitor may be powered by an external replaceable six volt battery.

Leads from each of the metallic media are brought out via a waterproof connector to the monitor. The signal on the wires is passed through a current limiting resistor and filtered to smooth out any fluctuations. The resulting signal is then compared to two reference voltages which have been created through voltage dividers from the battery. The comparisons are done by a resistor comparator integrated circuit chip. One comparison is for the yellow light and the other for the red light. If the comparison indicates the incoming signal is below either reference voltage, a LED flasher circuit is activated and then either the yellow or red light will begin flashing. A low battery detection circuit is built in. When the battery drains to a low level, the green LED light 124 will flash until a new battery is inserted or until the existing battery drains down completely.

Further included in the electronics within the meter 86 housing is the dial of the voltmeter 126 indicating the D.C. current being generated within the device as well as an ON switch 128 and a separate OFF switch 130 to activate and deactivate the electronics within the housing 86.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A water purification device for effectively eliminating bacteria in the water of a swimming pool including a water recycling system which in turn includes a pump wherein a quantity of water from the pool is withdrawn and returned thereto by the pump via suitable water conduits, said device comprising a housing having a hollow body including water inlet and outlet means and having a closed upper end and a lower end including a seat for receiving a disposable hollow canister, said canister having upper and lower ends and a side wall shell adapted for disposition in said body with said upper end spaced from said body upper end and said side wall shell spaced from the inner walls of said body and said canister lower end disposed on said seat so as to form an interior chamber in said body which in turn surrounds said canister, cap means having water outlet means and means for removably positioning said canister in said housing, said canister lower end operatively associated with said water inlet means such that water moves from said lower end through said canister and through said cap water openings into said chamber and thence to said water outlet means, said canister having a voltaic cell of two dissimilar metal components wherein one of said metals is silver and wherein the component parts of such cell are spaced from each other by said water flowing therebetween so as to form a conductor such that silver ions are released into the water.

2. The device of claim 1, said cell including an elongated element having a silver outside surface centrally disposed in said canister and running between said upper and lower ends thereof.

3. The device of claim 2, said cell including a copper sleeve positioned on the inside surface of said canister outer shell.

4. The device of claim 1 including a voltmeter supported by said housing and connected to each of said metal components to determine the point at which one of said metal components is exhausted and, accordingly, that the canister requires replacing.

5. The device of claim 2, said elongated element being a tube having opposed first and second ends and removably connected at its first end to said housing proximal said seat and removably connected at its second end to said cap means.

6. The device of claim 5, said tube including a silver coating on the outside surface thereof.

7. The device of claim 5, said tube including a silver sleeve positioned on the outside surface thereof.

8. The device of claim 3, including a voltmeter supported on the outside of said housing, said voltmeter connected via a silver wire to said silver surface and to said copper sleeve via a copper wire.

9. The device of claim 4, including signal means connected to said voltmeter to signal a predetermined voltage change to indicate near complete usage of one of said metals.

10. The device of claim 1 wherein the interior of said canister includes a filter media such as activated charcoal, silica gel or the like.

11. A water purification device for effectively eliminating bacteria in a body of water such as a swimming pool, said device including a canister including means for passing water into, through and out of said canister, said canister having a voltaic cell of two dissimilar metal components wherein one of said metals is silver and wherein the component parts of such cell are spaced from each other by said water flowing therebetween so as to form a conductor such that silver ions are released into the water, said canister being of elongated hollow configuration and including an elongated disposed element having a silver outside surface centrally disposed in said canister and running between upper and lower ends thereof.

12. The device of claim 11, said cell including a copper sleeve positioned on the inside surface of said canister.

13. The device of claim 11, including a voltmeter supported by said device and connected to each of the metal components of said cell.

14. The device of claim 13, including signal means connected to said voltmeter to signal a predetermined voltage change to indicate near complete usage of one of said metals.

* * * * *